(12) United States Patent
Loubier

(10) Patent No.: US 8,248,984 B2
(45) Date of Patent: Aug. 21, 2012

(54) SYSTEM AND METHOD FOR INTERFACING DEVICES

(75) Inventor: Christopher Loubier, Cave Creek, AZ (US)

(73) Assignee: I Squared LLC, Cave Creek, AZ (US)

( * ) Notice: Subject to any disclaimer, the term of this patent is extended or adjusted under 35 U.S.C. 154(b) by 1044 days.

(21) Appl. No.: 12/141,624

(22) Filed: Jun. 18, 2008

(65) Prior Publication Data

US 2009/0006815 A1    Jan. 1, 2009

Related U.S. Application Data

(60) Provisional application No. 60/945,275, filed on Jun. 20, 2007.

(51) Int. Cl.
*H04H 20/71* (2008.01)
(52) U.S. Cl. .................................. 370/312; 709/250
(58) Field of Classification Search .................. 712/208; 370/312; 709/250
See application file for complete search history.

(56) References Cited

U.S. PATENT DOCUMENTS

| | | | |
|---|---|---|---|
| 3,952,209 A | 4/1976 | Shaklee et al. | |
| 5,175,484 A | 12/1992 | Witehira et al. | |
| 5,465,010 A | 11/1995 | Rimmer | |
| 5,504,414 A | 4/1996 | Kinoshita | |
| 5,504,655 A | 4/1996 | Underwood et al. | |
| 5,587,890 A | 12/1996 | Happ et al. | |
| 5,615,080 A | 3/1997 | Nishitani et al. | |
| 5,643,693 A | 7/1997 | Hill et al. | |
| 5,742,781 A * | 4/1998 | Bajwa | 712/208 |
| 5,795,193 A | 8/1998 | Yang | |
| 5,801,925 A | 9/1998 | Boada Fonts | |
| 5,847,520 A | 12/1998 | Theurillat et al. | |
| RE36,037 E | 1/1999 | Rimmer | |
| 5,949,148 A | 9/1999 | Wagner | |
| 5,973,409 A | 10/1999 | Neibecker et al. | |
| 5,990,570 A | 11/1999 | Yoshida et al. | |
| 5,990,573 A | 11/1999 | Granitz et al. | |
| 6,150,734 A | 11/2000 | Neibecker et al. | |
| 6,157,091 A | 12/2000 | Yoshida et al. | |
| 6,163,082 A | 12/2000 | Yoshida et al. | |
| 6,166,909 A | 12/2000 | Sumida | |
| 6,169,337 B1 | 1/2001 | Yoshida et al. | |
| 6,219,609 B1 | 4/2001 | Matsuno et al. | |
| 6,226,305 B1 | 5/2001 | McLoughlin et al. | |
| 6,227,914 B1 | 5/2001 | Lee et al. | |
| 6,280,253 B1 | 8/2001 | Kraus et al. | |
| 6,294,845 B1 | 9/2001 | Yoshida et al. | |
| 6,307,279 B1 | 10/2001 | Yoshida et al. | |
| 6,420,797 B1 | 7/2002 | Steele et al. | |
| 6,469,404 B1 | 10/2002 | Pohjola | |
| 6,471,020 B1 | 10/2002 | Hernandez | |
| 6,496,377 B1 | 12/2002 | Happ et al. | |
| 6,524,136 B2 | 2/2003 | Kawaguchi et al. | |
| 6,534,883 B2 | 3/2003 | Yoshida et al. | |
| 6,538,400 B2 | 3/2003 | Fowler et al. | |
| 6,679,344 B1 | 1/2004 | Bertram et al. | |

(Continued)

*Primary Examiner* — Kenny Lin
(74) *Attorney, Agent, or Firm* — K&L Gates LLP

(57) ABSTRACT

A system in one embodiment includes (i) an interface module to control and monitor the system; a plurality of power cells which act as a point of power delivery and monitor environmental variables that effect function and reliability, (ii) a radio frequency transmitter and receiver to manage nodes distributed across the plurality of power cells, (iii) a maintenance module presenting information requests to be forwarded to the plurality of power cells, and (iv) a communication bus for distribution of data throughout the system.

19 Claims, 12 Drawing Sheets

U.S. PATENT DOCUMENTS

| | | |
|---|---|---|
| 6,879,057 B1 | 4/2005 | Pinas et al. |
| 6,948,950 B2 | 9/2005 | Yamaguchi |
| 6,982,540 B2 | 1/2006 | Richter et al. |
| 7,007,179 B2 | 2/2006 | Mares et al. |
| 7,020,790 B2 | 3/2006 | Mares |
| 7,037,124 B2 | 5/2006 | Lee et al. |
| 7,075,273 B2 | 7/2006 | O'Gorman et al. |
| 7,161,782 B2 | 1/2007 | Juntunen et al. |
| 7,162,653 B2 | 1/2007 | Mares et al. |
| 7,406,370 B2 | 7/2008 | Kojori et al. |
| 7,469,759 B2 | 12/2008 | Botzelmann |
| 2004/0264281 A1* | 12/2004 | Vangal et al. ............ 365/230.06 |

* cited by examiner

FIG. 4

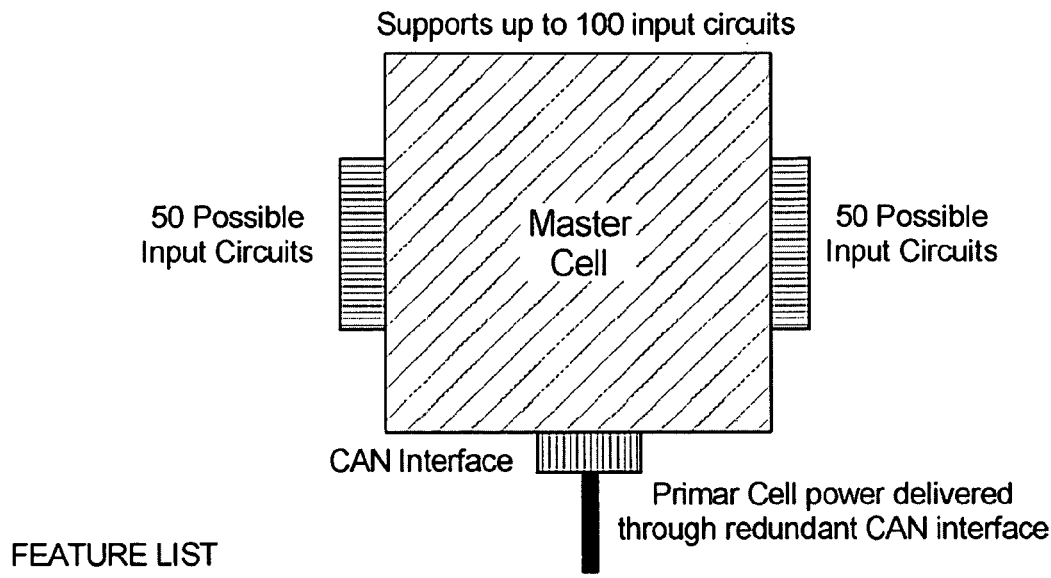

Supports up to 100 input circuits

50 Possible Input Circuits — Master Cell — 50 Possible Input Circuits

CAN Interface

Primar Cell power delivered through redundant CAN interface

FEATURE LIST

- Single Master Cell supports up to 100 TVS protected inputs
- Intelligent Power Supply can overcome software errors and substrate SCR conditions
- All interconnect cabling is doubly redundant
- Inputs multiplexed through tri-state data bus
- RF Cell functions are randomly re-distributable throughout 100-node Power Cell output structure
- Supports up to 4 transmitters/receiver
- Automatic RF Cell detection and operation
- Automatic Maintenance Cell detection and operation

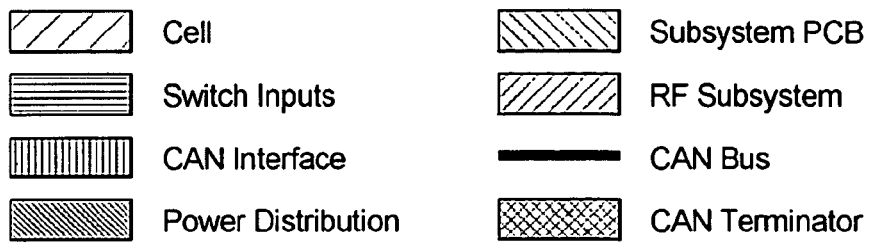

| | | | |
|---|---|---|---|
| ▨ Cell | | ▨ Subsystem PCB | |
| ▦ Switch Inputs | | ▨ RF Subsystem | |
| ▦ CAN Interface | | ━ CAN Bus | |
| ▨ Power Distribution | | ▨ CAN Terminator | |

FIG. 5
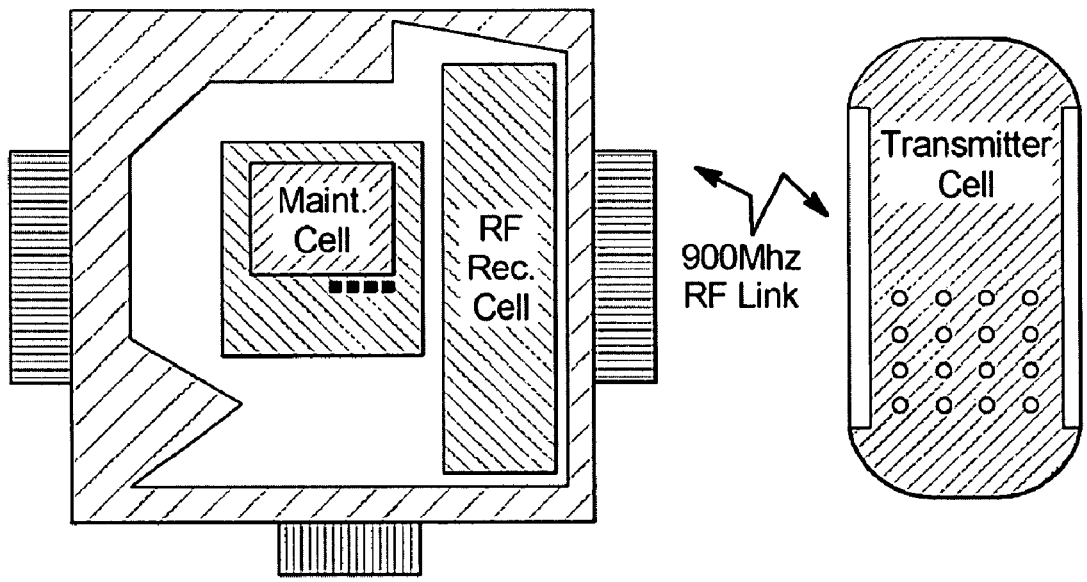
- RF Cell functions are randomly re-distributable throughout 100-node Power Cell output structure
- RF Cell supports up to 4 transmitters/receiver
- Maintenance Cell LCD display supports Inter-Cell messaging and user readout
- Automatic RF Cell detection and operation
- Automatic Maintenance Cell detection and operation
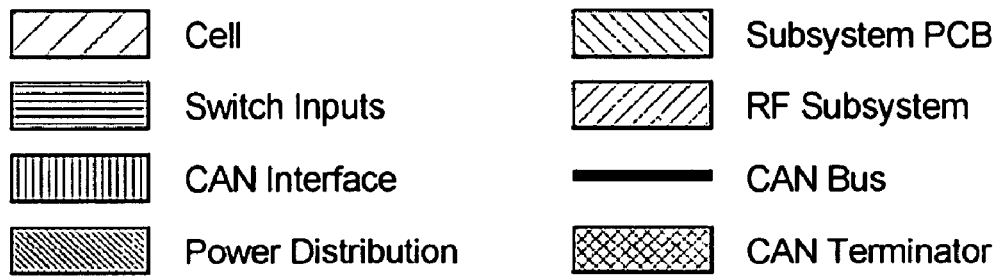

FIG. 7A

Redundant - Reconfigurable CAN bus

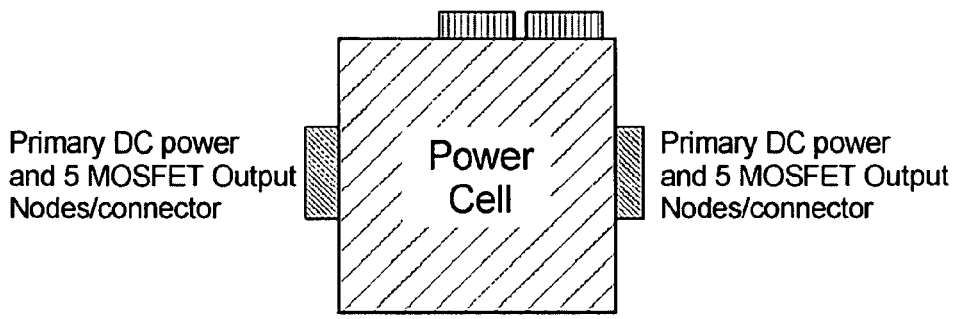

FEATURE LIST

- Single Power Cell provides 10 TVS protected Power MOSFET output nodes
- Intelligent Power Supply can overcome software errors and substrate SCR conditions
- Cell becomes autonomous in failed communications mode
- Monitors all critical environmentals to support Safe-Area operation
- Secondary interface provides for MOSFET operation to overcome controls system failure
- MOSFET driver circuits immune to high frequency oscillation
- Redundant MOSFET driver, charge pump circuits
- Redundant primary DC input circuits
- Under ISIS Processing Engine, any node can assume any personality trait desired
- Node personality assignment totally dynamic
- "Wired" and RF based node control
- Any system function can be assigned to any node on any cell under software control The Power Cell is capable of:
20 Amps/MOSFET Node continuous DC load @ 14.2 Volts
100 Amps/MOSFET node (500ms duration) DC load @ 14.2 Volts
50 Amps/bank of 5 MOSFET outputs continuous DC load @ 14.2 Volts
100 total Amps/Cell distributed across 10 MOSFET outputs @ 14.2 Volts DC

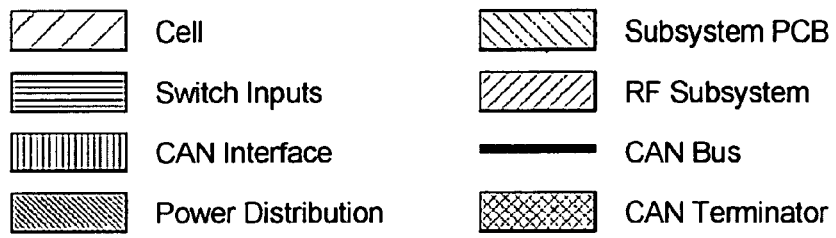

FIG. 7B
Redundant - Reconfigurable CAN bus
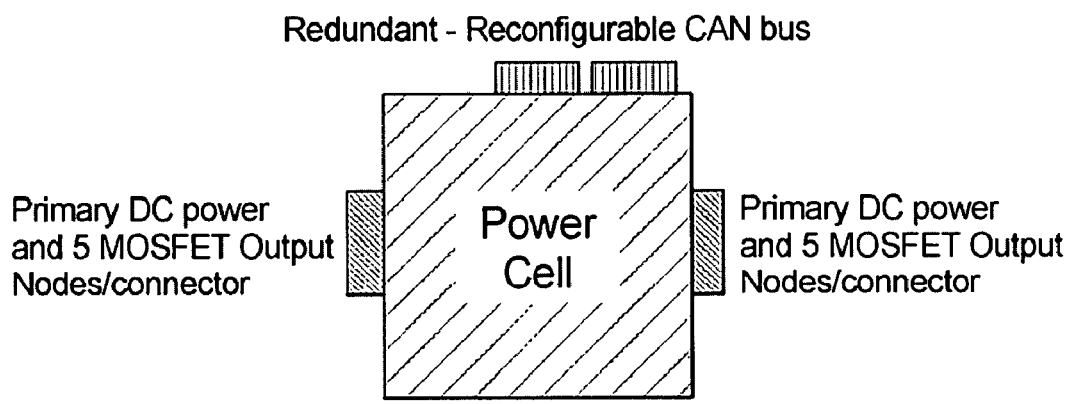
FEATURE LIST - continued
- Each output Node supports diagnostic LED that indicates Blown Fuse, Open Load and "Normal" operation
- LED illuminates body of fuse for easy identification in reduced light conditions
- Power Cells can be Key-Addressed identically to allow for on-line redundancy
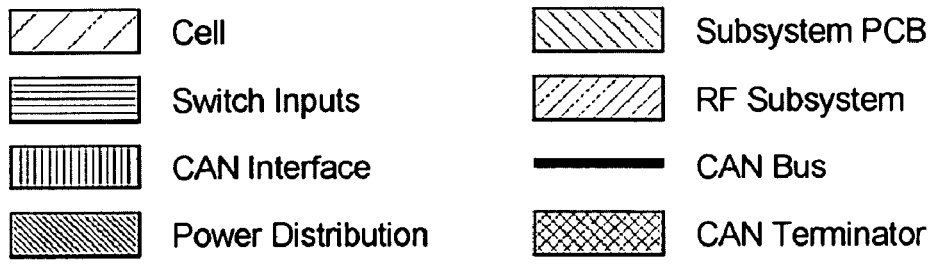

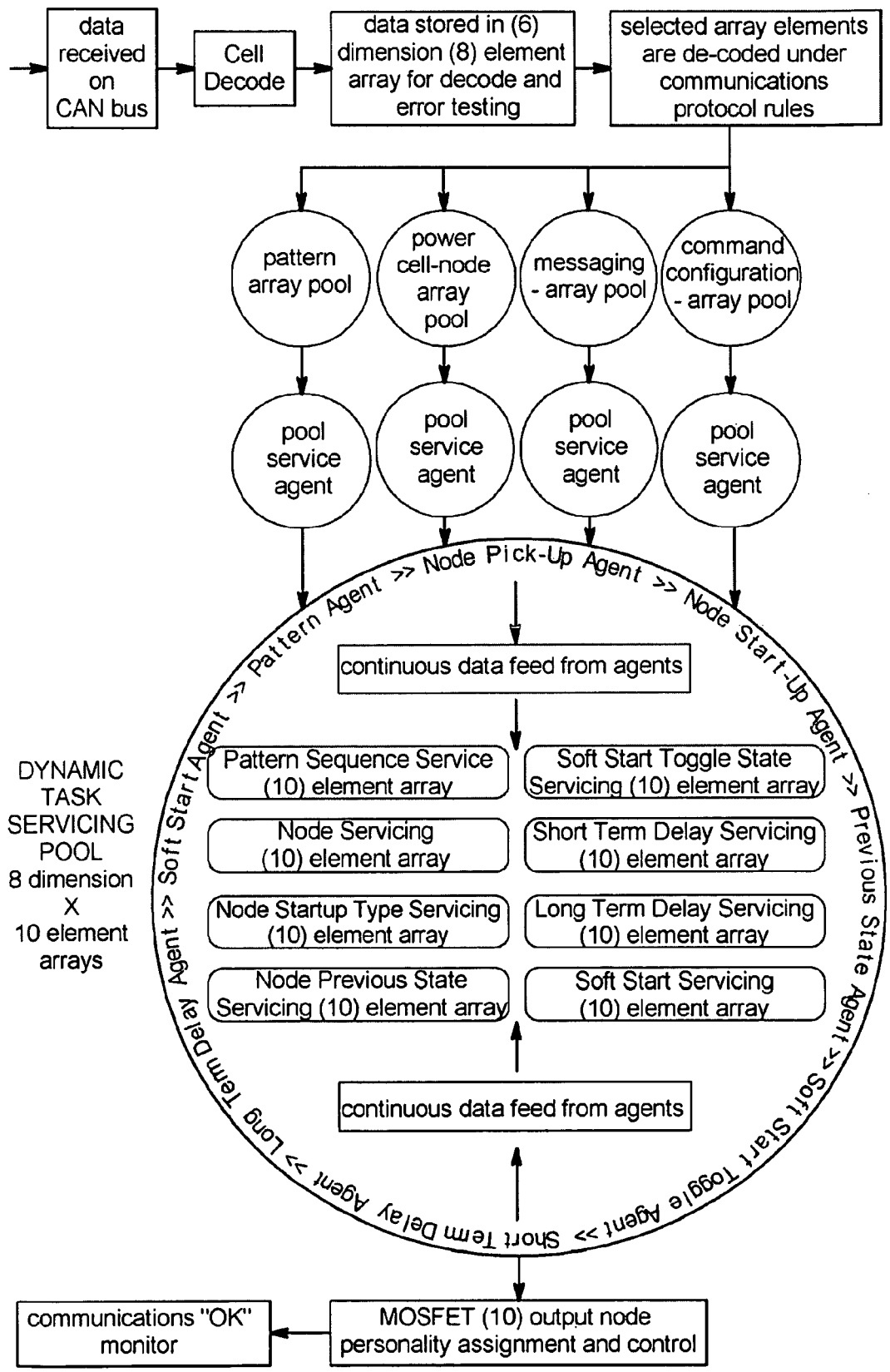

SYSTEM AND METHOD FOR INTERFACING DEVICES

PRIORITY CLAIM

This application claims priority to and the benefit of provisional U.S. Patent Application No. 60/945,275, filed Jun. 20, 2007, and expressly incorporates it contents herein by reference.

BACKGROUND

A control system is a device or set of devices to manage, command, direct or regulate the behavior of other devices or systems. There are two common classes of control systems, with many variations and combinations: logic or sequential controls, and feedback or linear controls. There is also fuzzy logic, which attempts to combine some of the design simplicity of logic with the utility of linear control. Some devices or systems are inherently not controllable.

The term "control system" may be applied to the essentially manual controls that allow an operator to, for example, close and open a hydraulic press, where the logic requires that it cannot be moved unless safety guards are in place. An automatic sequential control system may trigger a series of mechanical actuators in the correct sequence to perform a task. For example various electric and pneumatic transducers may fold and glue a cardboard box, fill it with product and then seal it in an automatic packaging machine.

In the case of linear feedback systems, a control loop, including sensors, control algorithms and actuators, is arranged in such a fashion as to try to regulate a variable at a setpoint or reference value. An example of this may increase the fuel supply to a furnace when a measured temperature drops. PID controllers are common and effective in cases such as this. Control systems that include some sensing of the results they are trying to achieve are making use of feedback and so can, to some extent, adapt to varying circumstances. Open-loop control systems do not directly make use of feedback, but run only in pre-arranged ways.

Traditional wiring solutions include, for example, fuse panels with wiring harness kits. These kits are used, for example, with vehicles in order to provide a fixed architecture. Typically, a fuse panel facilitates all power distribution and a selection of switches provide flexibility in the wiring approach. Customers are therefore able to reduce costs up front. However, due to the fixed nature of the wiring, the systems are not easily modified after installation. As a result, this type of wiring solution incurs high installed costs, high capacity switches, no inherent circuit buffering, no ability for "smart" diagnostic and monitoring, no inherent user interface and no inherent RF control capability.

Other wiring solutions include VEC, DUAL-VEC, Smart VEC and other similar devices. These solutions are 3 dimensional metallic matrices where the interconnections are presented to the manufacturer for hard "programming" at the manufacturers site (the interconnects are welded together). These assignments create connections between the primary source of DC power, a fuse or relay (switching element) and an output terminal. This "programming" is permanent and inherently limited in several ways, as follows:

1. The 3 dimensional metallic matrix has a fixed 1 to 1 relationship between the input (control) and output (power distribution) and it's protection (fuse) and control (relay) element.
2. The 3 dimensional metallic matrix prohibits the arrangements of input and output control circuitry to exist on discrete connectors. Input control and output must be mixed on the same connectors which can increase the complexity of control and distribution wiring.
3. No VEC type solution is expandable without adding additional control circuit wiring.
4. Every control wire must travel from the switching element to the physical VEC device.
5. Control circuitry is limited to electromechanical relays

SUMMARY

In one embodiment of the present disclosure, there is a system, including an interface module to control and monitor the system; a plurality of power cells which act as a point of power delivery and monitor environmental variables that effect function and reliability; a radio frequency transmitter and receiver to manage nodes distributed across the plurality of power cells; a maintenance module presenting information requests to be forwarded to the plurality of power cells; and a communication bus for distribution of data throughout the system.

In another embodiment of the present disclosure, there is a system, including an input device produces a voltage output which activates the system; a decoder buffers an active state of an input derived from the voltage output from the input device; a processor enables the decoder based on the state of input from the input device, and compares a current state of the decoder to a previous state of input from the input device of an array stored in the processor, to validate a state change; and a processor array decodes and associates the validated state change with predefined functions.

In still another embodiment of the present disclosure, there is a method for interfacing devices, including producing a voltage output which activates the system; buffering an active state of an input derived from the voltage output from the input device; enabling the decoder based on the state of input from the input device; comparing a current state of the decoder to a previous state of input from the input device of an array stored in the processor, to validate a state change; and decoding and associating the validated state change with predefined functions.

Additional features and advantages are described herein, and will be apparent from, the following Detailed Description and the Figures.

BRIEF DESCRIPTION OF THE FIGURES

FIG. 4 shows an exemplary master cell in connection with the system of the present disclosure.

FIG. 5 shows another exemplary master cell in connection with the system of the present disclosure.

FIGS. 7a and 7b show an exemplary power cell in connection with the system of the present disclosure.

FIG. 11 shows an exemplary flow of the processing engine for managing the power cell in connection with the system of the present disclosure.

DETAILED DESCRIPTION

Figure 1:
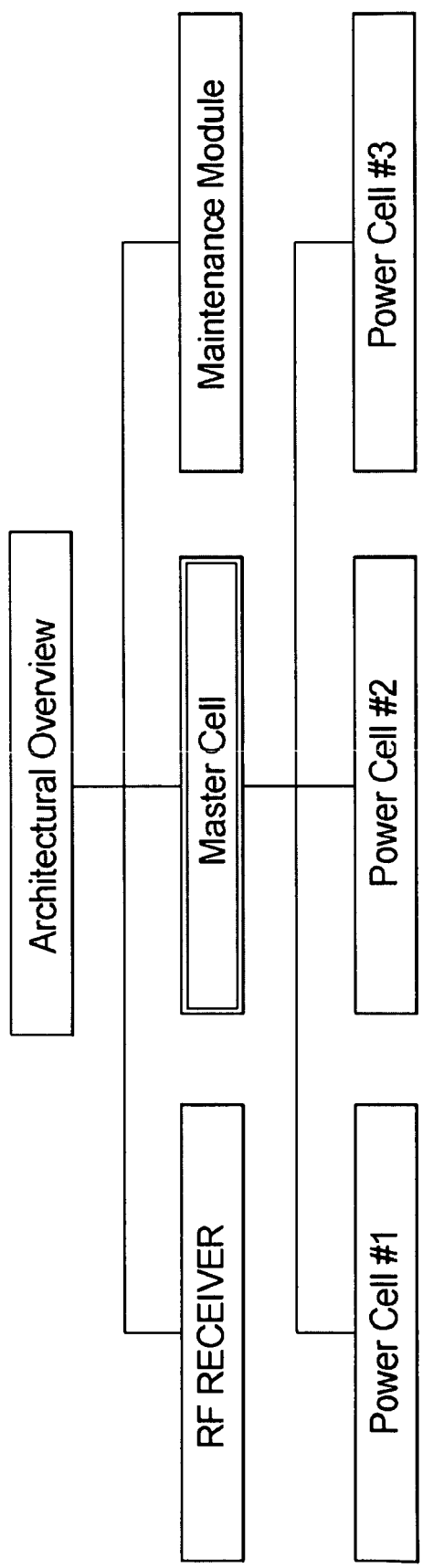
FIG. 1 shows an exemplary architecture of the system according to one embodiment of the present disclosure.
Figure 2:
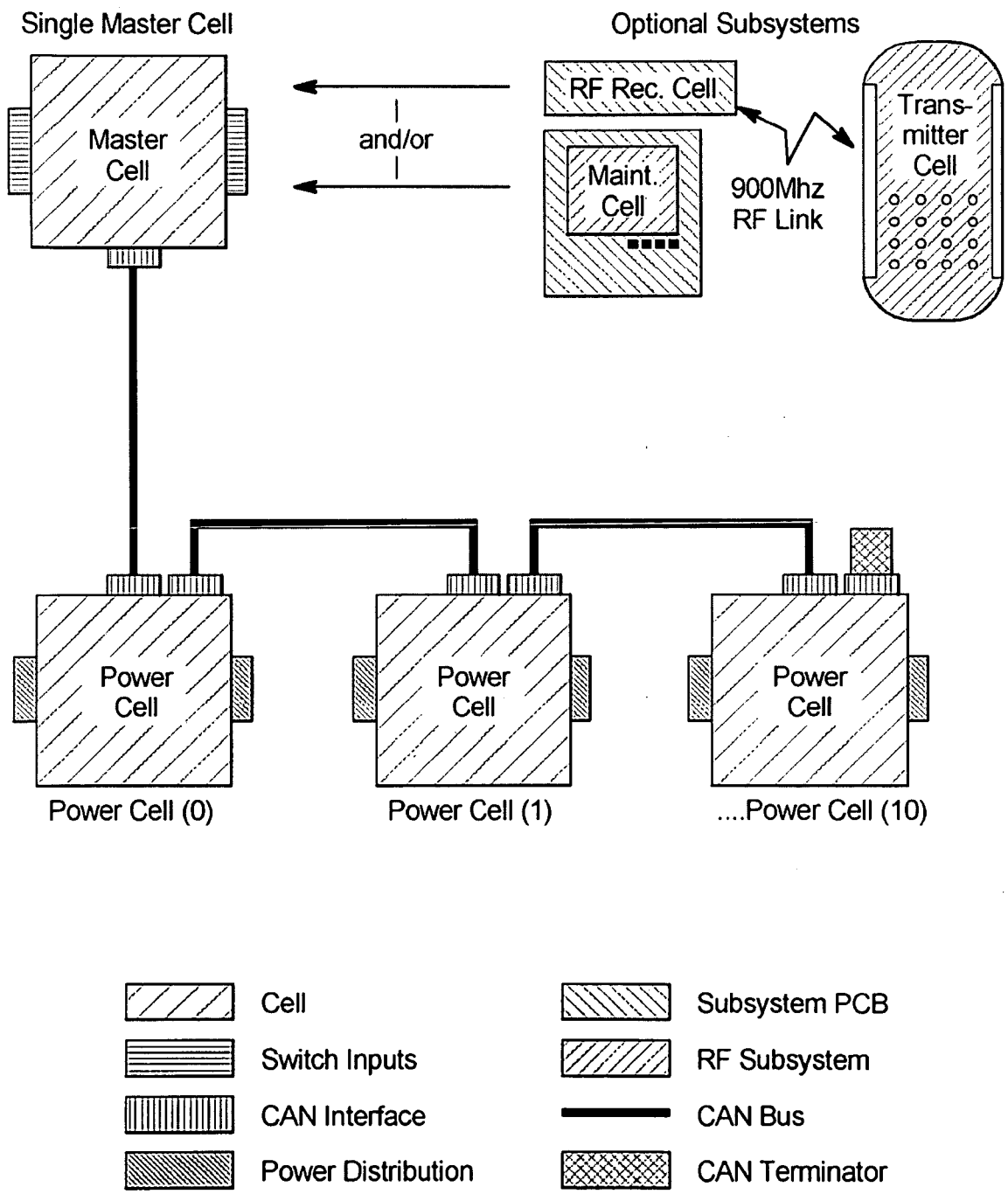
FIG. 2 shows an exemplary embodiment of the system of the present disclosure.
Figure 3:
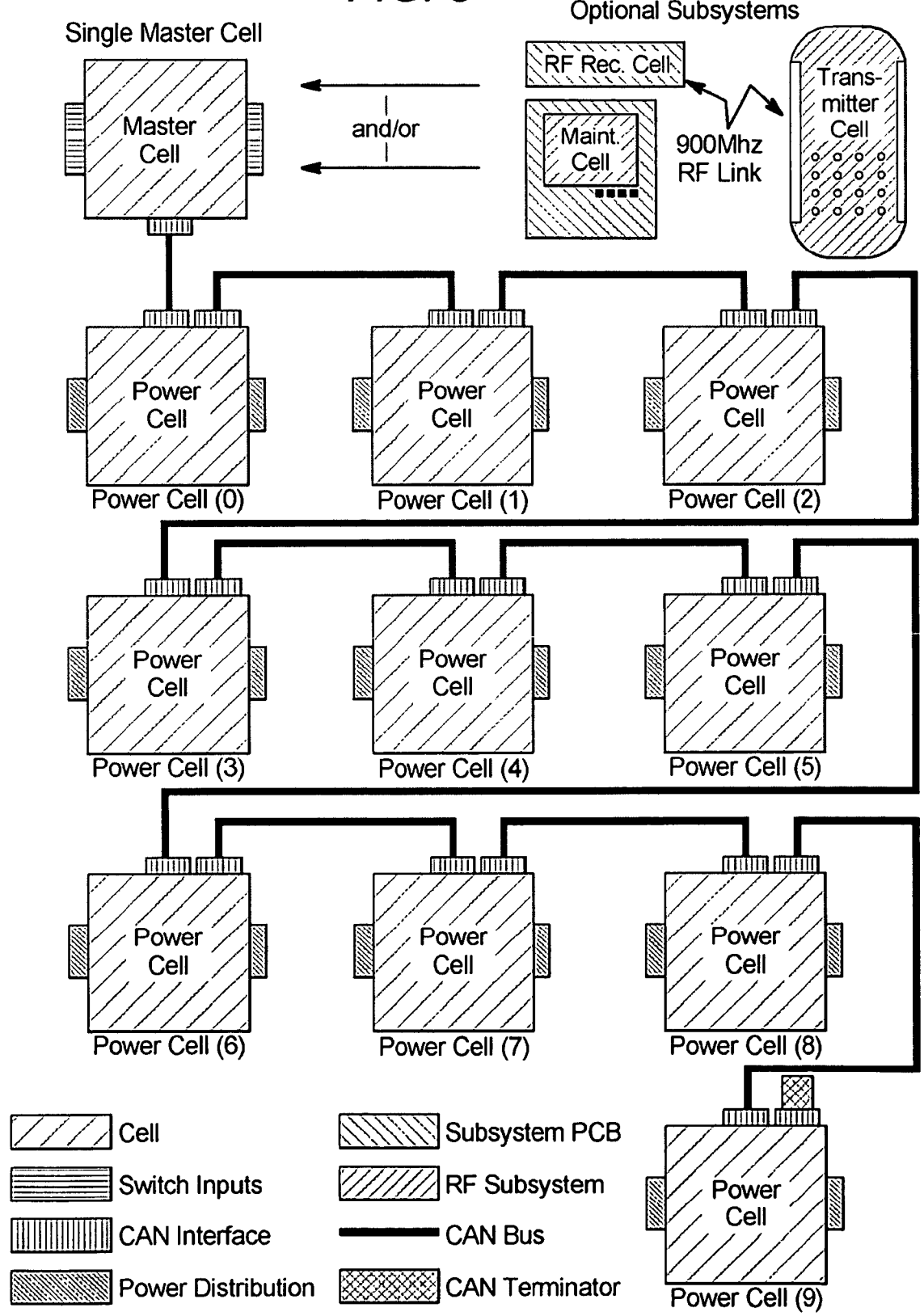
FIG. 3 shows an exemplary embodiment of the system with complimentary power cells.

FIGS. 1, 2 and 3 show an exemplary architecture of the system according to the present disclosure. In this embodiment, the system includes a device functioning in the role as a Master Cell, and other devices, such as Power Cells functioning in the role as the point of power distribution in the system. A mutual interface for the Cell elements is, for example, a physical and electrical standard for a Controller Area Network ("CAN") serial data-bus. The master cell is typically one per system, and functions as the primary governing element. The cell also acts as an interface for analog devices, such as switches, to the digital world. Numerous control inputs are provided for each system, which enables the master cell to control and coordinate all intra-cell communications and messaging. The system allows numerous power cells for each master cell installed in the system, and a single power cell can provide, for example, numerous protected power MOSFET output nodes. Each power cell is individually addressable, and are able to monitor environmental variables that effect function and reliability. The cells are autonomous in function for both normal and failed communication states, and a physical interface allows direct control over failed intelligent elements. Another element in the system is the RF Transmitter and Receiver Sub-System. This Sub-System provides, for example, 900 Mhz RF management of numerous nodes distributed across any number of power cells. There is no restriction as to how the control points are distributed or how many nodes can be assigned to any cell. In addition to the elements illustrated in FIG. 1, the system may also include an LCD Maintenance Module or Sub-System which provides utility to the operator(s) of a system in allowing information requests to be forwarded to any power cell in the System, and to then display the responses to those requests on the LCD display. The responses characterize, for example, environmental and node-state information to the operator. Finally, a communications bus, such as the industry standard CAN bus electrical interface with proprietary data protocol, allows simple expansion or contraction of the physical bus.

Master Cell Hardware

FIG. 4 shows an exemplary master cell in connection with the system of the present disclosure. The master cell is constructed based on a centralized computing element (such as a microcontroller) operating, for example, at 18432000 Hz. The crystal frequency should preferably be selected to mitigate baud-rate errors in data transmission over the CAN bus. The master cell microcontroller is in-circuit programmable through, for example, a pin header on the PCB. This allows for field-programmability of the master cell.

Analog devices are interfaced to the microcontroller through, for example, a TVS diode protected tri-state data-bus. The hardware can accommodate numerous binary inputs, or, from various single ended inputs, or various double ended analog inputs. The analog interface may be custom to the application, and may or may not require additional signal conditioning to allow interface to the master cell analog to digital converter. The analog to digital converter is referenced against, for example, a precision voltage source. Depending on the application, both SA and SD converters will be available.

The power supply for the master cell is provided by the intra-cell cabling through, for example, a primary TVS diode protected, filtered linear voltage regulator. The system typically functions to a primary input voltage of 5.2 volt for the logic elements in the system, and the power paths are redundant and are sourced from each power cell in a preferred embodiment so as to mitigate the risk of a single point of failure. The power-supply can be managed, for example, by a pair of MOSFETs and a redundant charge-pump circuit that supplies control voltage to the MOSFETS. The power supply on the cells is intelligently managed in the preferred embodiment by the microcontroller and independent microcontroller watch-dog chip. In the event of an internal software error, or an SCR condition on the substrate of the microcontroller, the power supply will shut itself off and then restart, clearing the condition on the microcontroller substrate or software induced error. This feature protects the system even in 6-sigma events.

The master cell carries the single fixed end of the CAN bus architecture and electrical interface, as depicted in FIG. 4. The opposing end of the CAN bus is terminated through connectors (such as a DB-9) on the "last" power cell in the system. The CAN physical interface takes place through, for example, standard DB-9 connectors and preferably utilizes redundant pairs of wires to mitigate failure do to the loss of a single wire connection.

The master cell carries two independent interfaces for optional system features, as illustrated for example in FIG. 5: (1) RF Interface—This interface allows the attachment of an RF receiver cell to the master cell, as depicted in FIG. 5. This feature enables any master cell to distribute RF functionality throughout the multi-node system. The RF cell, in its preferred embodiment, is automatically recognized when attached to the system. (2) Maintenance Module—This interface allows the attachment of a maintenance cell to the master cell. This cell provides an LCD display and control buttons to allow a user to interrogate any power cell in the system for specific environmental or node state information. The maintenance module cell is configured, in the preferred embodiment, to be automatically recognized when attached to the system.

Master Cell Software

Figure 6:
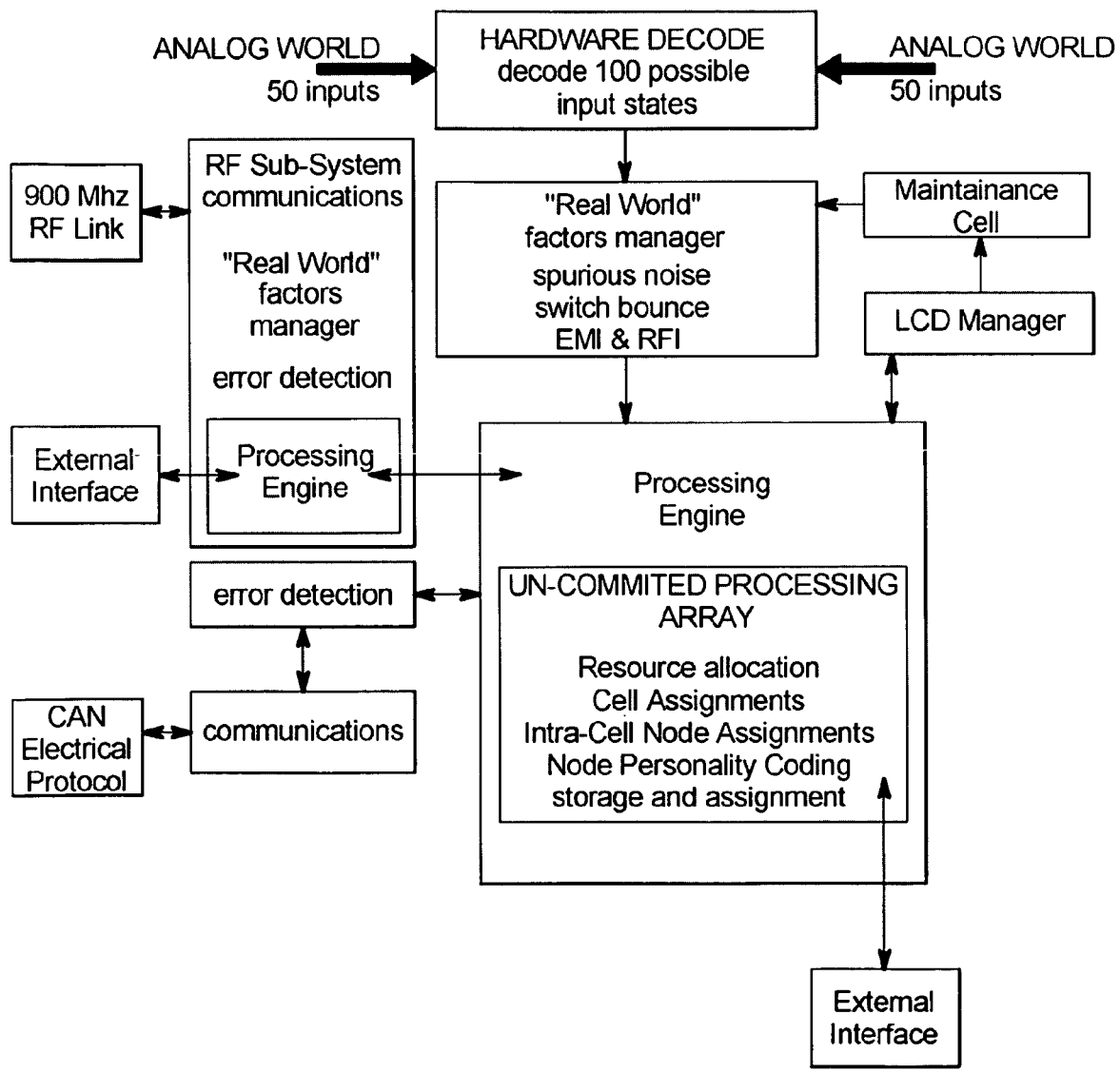
FIG. 6 shows an exemplary framework of processing data in the master cell of the system in the present disclosure.
Figure 8:
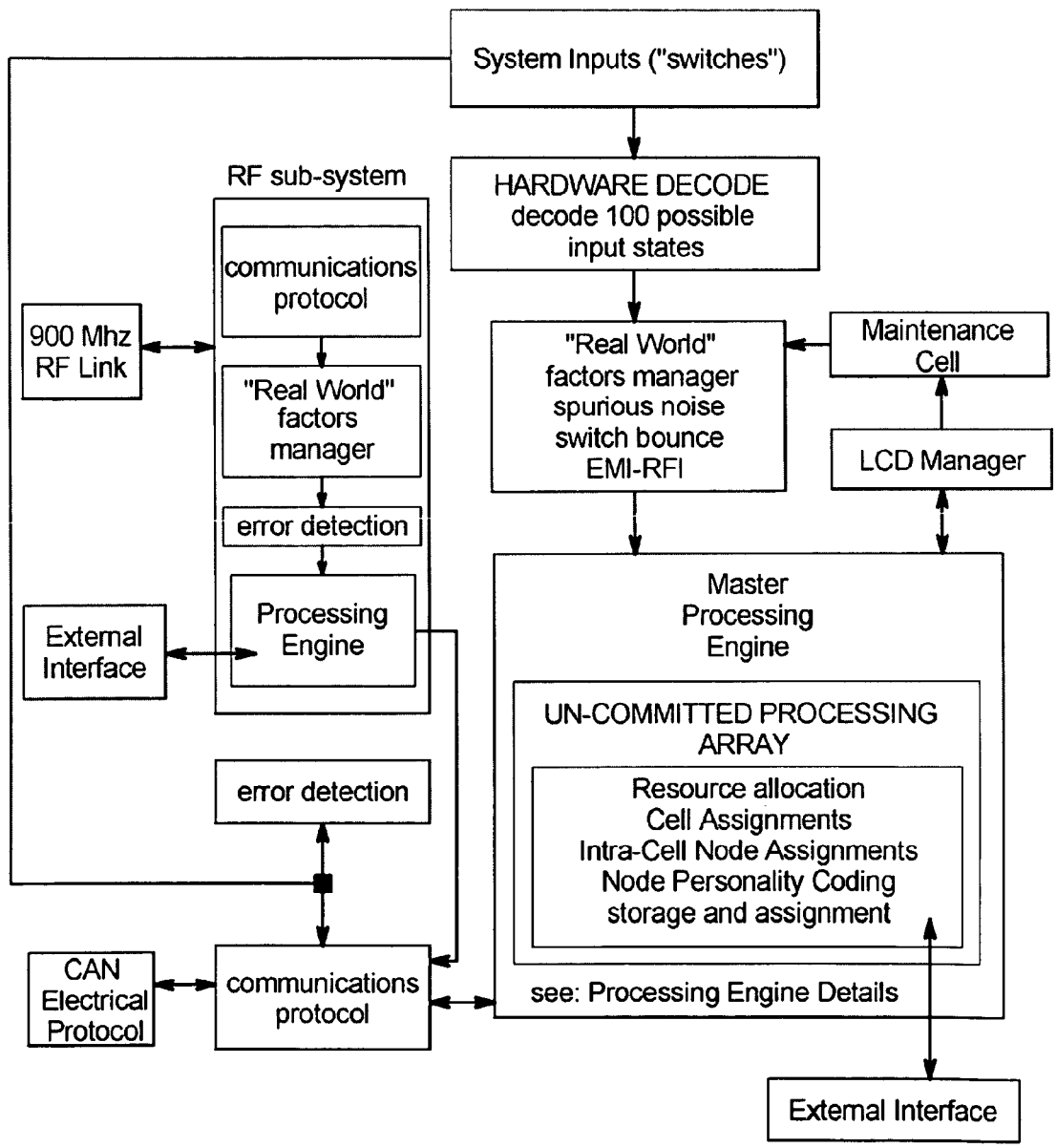
FIG. 8 shows an exemplary processing framework of the master cell in connection with the present disclosure.

FIG. 6 shows an exemplary framework of processing data in the master cell of the system in the present disclosure. The software that manages the functions on the master cell includes the following components: Hardware decode, Analog "real-world" factors management, Communications, Error detection, Resource allocation request (Cell assignments, Cell—Node personality storage and assignment), RF Cell—interface and management, and Maintenance Cell—interface and management.

Hardware decode: The software manages the decode of unique hardware addresses assigned to the various interfaces to the system. The unique addresses are presented sequentially to allow the tri-state data-bus to interface "N" number of inputs to a single, preferably 8 bit, data bus. The address scan of the optional modules performs pattern matching to determine if the RF or maintenance cell(s) are present. This pattern matching allows otherwise missing peripherals to be brought "on-line" dynamically. The software is optimized to perform this hardware decode function at the fastest rate possible, as allowed by the target processor.

Analog "real-world" factors management: The software evaluates the incoming analog signals for possible spurious or unstable analog conditions. The purpose of this evaluation is to mitigate the risk of such spurious or unstable analog information from propagating into the system power nodes. Time domain and state "scrubbing" methods are performed prior to a state change being allowed into the resource allocation or communications sections of the software.

Communications: Communications software manages the construction, transmission, reception and error detection of communications processes. The data packet structure includes elements that address each of the following areas.

Packet Structure:
Recognition and Synchronization
Cell address routing
Node address routing
Message Classification
Message Classification amenders
Message Parameters
Message Parameter amenders
Cell (Node) state
Error management
Suffix (end of packet notification)

The communications data is transmitted simultaneously to cells in the system. Localized cell software does a preliminary check before processing the content of the packet as:

Recognition and Synchronization elements are evaluated for correctness;
Element count and suffix components are evaluated for correctness; and
The entire packet is compared against the Error Management elements.

On success:
The header address is compared against the localized address assigned to the cell; and
The cell, node, message classification, message classification amenders, message parameter and message parameter amenders are disassembled and evaluated against a 10 dimension array that allocates resources, assigns methods and schedules events to manage a single node.

On failure:
The packet is discarded and changes are not allowed to take place on the intended cell or node.

Error detection (communications): A mathematical evaluation of the data that is included in the packet is constructed and sent along with the packet. This information, when compared with the packet received on the target system, allows detection of transmission errors or other data corruption, thus allowing for appropriate decision on the fate of the packet.

The Processing Engine

Figure 9:
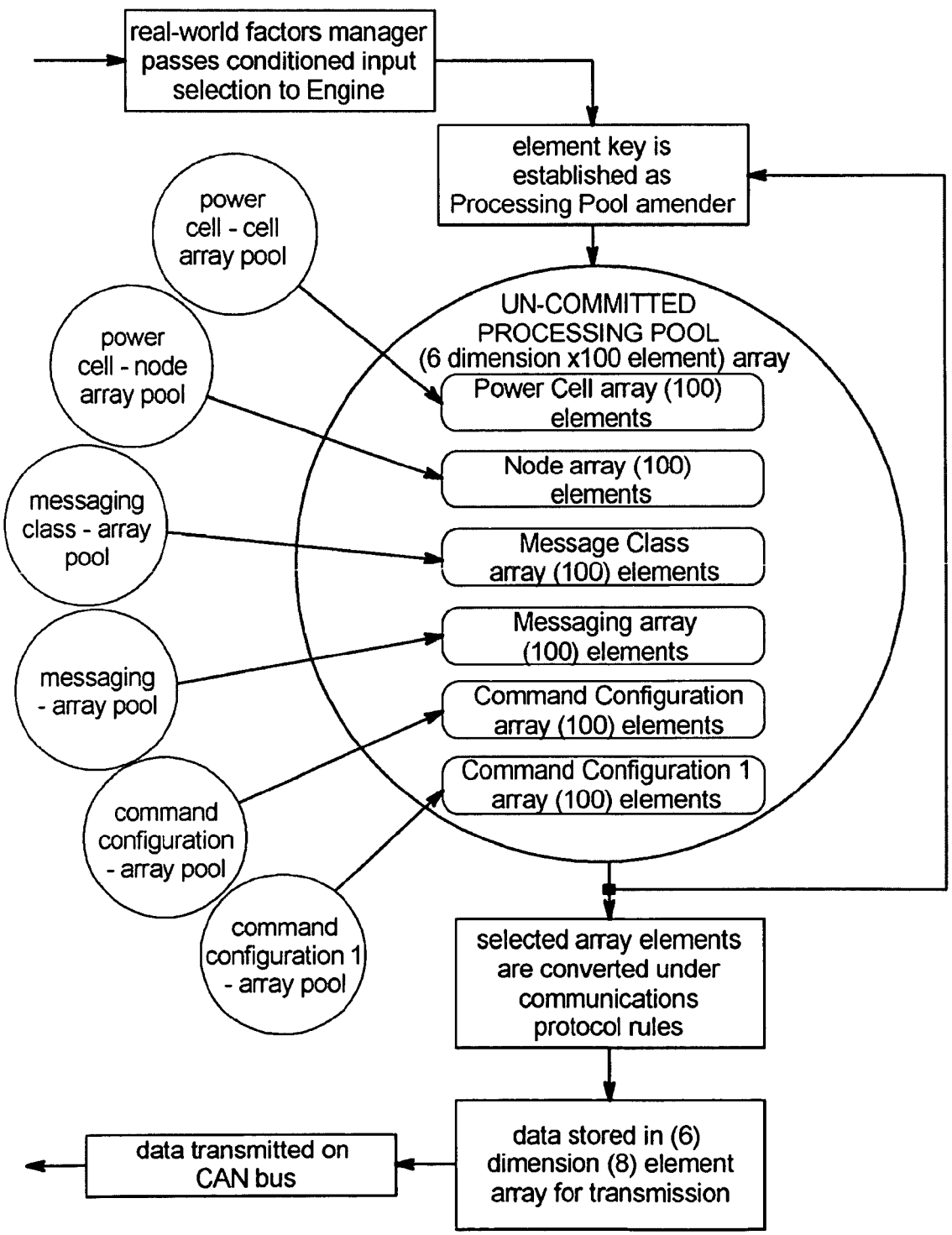
FIG. 9 shows an exemplary flow of the processing engine for managing the master cell in connection with the system of the present disclosure.
Figure 10:
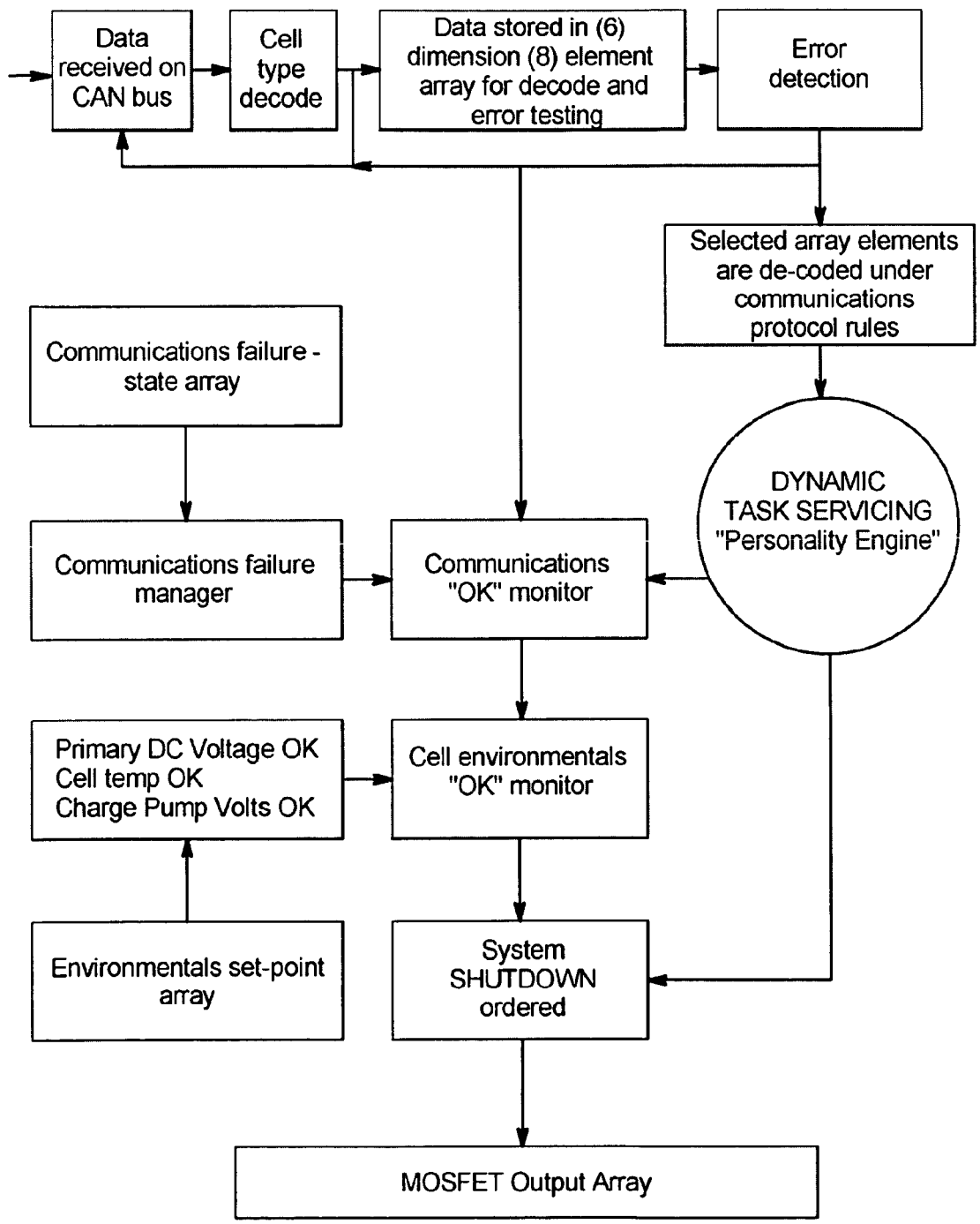
FIG. 10 shows an exemplary processing framework of the power cell in connection with the system of the present disclosure.

FIG. 9 shows an exemplary flow of the processing engine for managing the master cell in connection with the present disclosure. The processing engine itself is depicted, for example, in FIG. 6. In the software of the system, each of the major class of cell, power and master, are designed as processing engines without a fixed personality. Each of these software engines has, at its disposal, resources (properties, methods and events) that it can assemble in any combination, dynamically, to perform a specific type of task in a specific way. That is, a system with the software engines in-place and functional would not perform any task until the desired functions are determined and assigned as personality profiles to operate the MOSFET nodes on the power cell. These dynamically assembled personalities can be assigned to any of the MOSFET nodes on the power cell.

As an example, a node can be running the headlights in a Fire Truck and in the next moment be operating a PWM controlled hydraulic motor without physical changes to the system itself. Operation works as follows: Internal to the software structure on the master cell is a (6) dimension (40) element array that includes the potential personality profile for each node on each cell that could potentially be in the system. It should be noted that the 6×40 master cell is exemplary in nature. The dimension and element array numbers can be increased or decreased as necessary. For example, on a full-featured system, the array would be (6) dimensions with (100) elements in each dimension. These array structures are field programmable, and stored in memory, preferably in EEPROM. The array structures are therefore protected from any loss of system power, and would include the details of the job a node(s) will do, the cell it is on and how that job will be accomplished (all of which may be custom defined by the user/customer). In the array dimensions construct are coded classes of functions that act as primary directives when evaluated by the target cell. Message classes allow layered processing so that messages can be evaluated and processed in the least number of CPU cycles, improving system performance.

A simplified form of the details below is as follows:
1) Dimension-0 this is the CELL that the switch function is assigned to:
   Any switch can be assigned to any cell, there is no fixed relationship between any switch and the job that it will do or where that job will be performed.
2) Dimension-1 this is the NODE that the switch function is assigned to:
   Any switch can be assigned to any node on any cell.
3) Dimension-2 this is the PERSONALITY-TYPE of the node:
   Any node can assume the functional personality that is appropriate to the task and the man/machine interface, there is no fixed functionality.
4) Dimension-3 this is a TIME or FREQUENCY function/action amendment:
   These elements act to amend the basic functionality as defined in Dimension 2.
5) Dimension-4 this is a TIME, FREQUENCY or DIRECTION function/action amendment:
   These elements act to further amend the traits assigned in Dimension 2.

These directives include the fundamental class of a transmitted packet:
MESSAGE CLASSES:
Message Class is a Configuration Command to define the personality of a Cell-Node
Message Class is a Request for Information or Status
Message Class is a Response to Request for Information or Status
Message Class is an System Wide Broadcast
How the message is to be routed:
ROUTING:
Target Cell ID
Amenders determine target Cell Class (Master—Power)
Target Node ID
How the output node is to be configured initially:
NODE CONFIGURATION
Target Node State when directive is enforced
The personality traits the node should exhibit:
1) MESSAGE CLASSIFICATION AMENDERS (personality)
   a) TRACK (default state): the output node tracks the state of the input switch as sent from the master.

b) TRACK-SOFT-START: the node produces a 50% PWM output for 500 ms then the output node tracks the state of the input switch as sent from the master.
c) MOMENTARY: the node is a timed output measured in a time base of milliseconds as the smallest unit.
d) MOMENTARY-SOFT-START: the node produces a 50% PWM output for 500 ms then produces a timed output measured in a time base of milliseconds as the smallest unit.
e) TOGGLE: the output toggles ON/OFF with alternate states of the input.
f) TOGGLE-SOFT-START: the node produces a 50% PWM output for 500 ms then a steady state that toggles ON/OFF with alternate states of the input switch device.
g) TIMED: the node produces a 50% PWM output for 500 ms then the output node will remain on for a predetermined number of seconds using a time base of 1 second as the smallest unit.
h) TIMED-SOFT-START: the node produces a 50% PWM output for 500 ms then the output node will remain on for a predetermined number of seconds using a time base of 1 second as the smallest unit.
i) TURN ALL OUTPUTS OFF: Turn all the output nodes on this cell OFF, basically an EMERGENCY Shutdown command.
j) TURN All OUTPUTS ON: Simple system checkout based on a stored pattern or steady state output.
k) PATTERN SELECTION (any custom pattern is possible): Tells the power cell that a selection is to be made for a given output NODE to produce a specific repeating pattern of ON/OFF states typically used on emergency vehicles. This can also be use to do signaling such as on a boat or ship for SOS transmission. The timing of the output pulses is associated with a programmable parameter that produces corrected patterns for various devices. The pattern and timing that would drive a large halogen bulb would be very different that driving a loudspeaker type device. The same pattern can be run on different nodes with different parameters associated with each occurrence.

Functions that require additional discussion to determine application. Some of these will require alternative output types on the power cells and/or monitoring of some analog device on the master cell for control or feedback purposes.

2) Functions include:
a) STEPPER UNI-POLAR: A set of (4) outputs produce step patterns.
b) STEPPER BIPOLAR: A set of (4) outputs produce step patterns.
c) SERVO: A set of outputs produces output and feedback patterns.
d) PWM: A set of outputs produces PWM rates or patterns.

These are the "settings" associated with the personality of the node like time or PWM frequency.

MESSAGE PARAMETERS
USAGE (Depends Messaging and Node Configuration)
Condition 1—BYTE 1 defines a Timed action
Condition 2—BYTE 1 defines a Momentary action
Condition 3—BYTE 1 defines a Stepper Motor Action
Condition 4—BYTE 1 defines a PWM Action
Condition 5—BYTE 1 defines a SERVO Motor Action
Condition 5—BYTE 1 defines the selection of a Power Cell STORED PATTERN These have the ability to further amend the basic parameters or add additional features MESSAGE PARAMETER AMENDERS
Condition 1—BYTE 1 defines a Timed action
Condition 2—BYTE 1 defines a Momentary action
Condition 3—BYTE 1 defines a Stepper Motor Direction
Condition 4—BYTE 1 defines a PWM Duty Cycle
Condition 5—BYTE 1 defines a SERVO Motor Action
Error check is by necessity last.
ERROR CHECK BYTE: The mathematical form of all the above information is used by the target cell to check the integrity of the data transmission and validate it's contents.

The information is then assembled into the data packet structure listed above, along with synchronism information, and is ready to transmit to the target cell. The software, in a preferred embodiment, maintains a special (7) dimension, (8) character array to manage the coded data transmissions and receptions. This array acts as the "clearing house" for data movement into or out-of all cells.

Additional examples of personality traits (functions) include:
4 Way Flashers:
To program a cell with this particular function, the following instruction may be used:

```
CELL_1|NODE_4,
NODE_FOUR_WAY,
2,//this is the pattern array to process
10,//this is the multiple of the base timing to use
ISIS_POWER_CELL_TYPE_23
```

CELL_1|NODE_4,
For this particular exemplary function, the instruction is executed on CELL #1 and NODE #4. The "|" symbol instructs the processor to build a single control word from these two elements.
NODE_FOUR_WAY,
The personality trait of the function, in this example, is to execute automotive 4-Way flashers.
"2" represents the pattern array to process. Patterns are custom to an application and are referred to by their numerical value before use.
"10" represents the multiple of the base timing to use. For example, a value of 1 would mean 100 ms. A value of 10 is (10*100 ms) or 1 second between pattern elements being applied to the outputs on the cell.
ISIS_POWER_CELL_TYPE_23
This instruction refers to the "type" of Power Cell that the instruction can be executed on. Commands are "typed" to a specific model of Power Cell so as to manage resource and power requirements safely. If an instruction is coded and sent to the wrong type of Cell Type, the cell will reject the command.

Push On/Off Ign/St Start Button:
To program a cell with this particular function, the following instruction may be used:

```
CELL_1| NODE_NONE,
NODE_PUSH_ON_OFF,
NODE_PAIR_ID_9,
NODE_PAIR_ID_5,
ISIS_POWER_CELL_TYPE_23
```

CELL__1|NODE_NONE,
This instruction is executed on CELL #1 and NODE_NONE since this is a control pair and the nodes are assigned as element 3 in the control word.
The "|" symbol tells the processor to build a single control word from these two elements.
NODE_PUSH_ON_OFF,
The personality (function) to execute is for a PUSH/ON-PUSH/OFF type of starter button on, for example, an automobile. A "NODE PAIR" is established in the instruction which defines which outputs on the target Power Cell will be used to manage the functions. In execution, the Power Cell software evaluates various possible states of the output nodes to manage the sequencing of the starter motor and ignition power.
NODE_PAIR_ID_5,
The node pair are the IDs of the nodes that will perform the: Start Function
NODE_PAIR_ID_9,
The node pair are the IDs of the nodes that will perform the: Ignition Function
ISIS_POWER_CELL_TYPE_23
This is the "type" of Power Cell that the instruction and can be executed on. Instructions are "typed" to a specific model of Power Cell so as to manage resource and power requirements safely. If a command is coded and sent to the wrong type of Cell Type, the cell will reject the command.

Multi-Node
To program a cell with this particular function, the following instruction may be used:

```
CELL__1| NODE__NONE,
NODE__MULTI_NODE,
NODE_PAIR_ID__0|
NODE_PAIR_ID__2|NODE_PAIR_ID__5,
NODE_PAIR_ID__8| NODE_PAIR_ID__9,
ISIS__POWER_CELL__TYPE__23
```

CELL__1|NODE_NONE:
The instruction, for example, is executed on CELL #1 and NODE_NONE since the control pair and the nodes are assigned as element 3 in the control word. The "|" symbol informs the processor to build a single control word from these two elements.
MULTI_NODE:
The personality to execute is for an ON/OFF type of switch. This personality type allows, for example, a single input node on a Master Cell to manage multiple output nodes on a Power Cell.
NODE SET 1:
The first node set manages nodes 1-8.
NODE_PAIR_ID__0|NODE_PAIR_ID__2|NODE_PAIR_ID__5:
The example tells Power Cell 1 to turn nodes 1, 2 and 5 ON.
NODE SET 2:
The first node set manages nodes 9-10.
NODE_PAIR_ID__8|NODE_PAIR_ID__9:
The example tells Power Cell 1 to turn nodes 9 and 10 ON.
ISIS_POWER_CELL_TYPE__23:
The "type" of Power Cell that the instruction can be executed on. Instructions are "typed" to a specific model of Power Cell so as to manage resource and power requirements safely. If a command is coded and sent to the wrong type of Cell Type, the cell will reject the command.

Multi-Node-Delayed
To program a cell with this particular function, the following instruction may be used:

```
CELL__1| NODE__NONE,
NODE__MULTI_NODE__DELAYED,
NODE_PAIR_ID__0|NODE_PAIR_ID__2|NODE_PAIR_ID__5,
NODE_PAIR_ID__8| NODE_PAIR_ID__9,
ISIS__POWER_CELL__TYPE__23
```

CELL__1|NODE_NONE:
The instruction, for example, is executed on CELL #1 and NODE_NONE since this is a control pair and the nodes are assigned as element 3 in the control word. The "|" symbol tells the processor to build a single control word from these two elements.
NODE_MULTI_NODE_DELAYED:
The personality to execute is for ON/OFF type of switch for each specified output. This personality type allows a single input node on a Master Cell to manage multiple output nodes on a Power Cell. Additionally there will be a 100 ms delay between each output being cycled on or off.
NODE SET 1:
The first node set manages nodes 1-8.
NODE_PAIR_ID__0|NODE_PAIR_ID__2|NODE_PAIR_ID__5:
The example tells Power Cell 1 to turn nodes 1, 2, and 5 ON.
NODE SET 2:
The first node set manages nodes 9-10.
NODE_PAIR_ID__8|NODE_PAIR_ID__9:
The example tells Power Cell 1 to turn nodes 9 and 10 ON.
ISIS_POWER_CELL_TYPE__23
This is the "type" of Power Cell upon which the instruction can be executed. Instructions are "typed" to a specific model of Power Cell so as to manage resource and power requirements safely. If an instruction is coded and sent to the wrong type of Cell Type, the cell will reject the command.

User—Customer Programming of Cells
In an exemplary application of the system, there will be a Windows based interface that will allow any user/customer to easily and simply configure the attributes of their system. The software will provide a GUI displaying, for example, a cell and cell-node map that will represent the configuration required in their application. The software will have a feature that allows storage and retrieval of stored profiles that will allow efficient programming of multiple cell systems or mass production of multiple systems. Additional application hardware will allow the user interface to perform actual programming of the hardware.

Internet Interface
In an exemplary application of the system, there will be a Windows based interface that will allow for the remote management and programming of master cells using the Internet. This software and application hardware will allow off-site management of the cell personalities for customers who wish this type of service or to bring expert knowledge to an application from a remote location.

Power Cell—Hardware
FIGS. 7a and 7b show an exemplary power cell in connection with the system of the present disclosure. The power cell microcontroller is in-circuit programmable through a, preferably 7, pin header on the PCB. This allows for field-programmability of the power cell.

MOSFET Interface

Analog devices are interfaced to the microcontroller through, for example, an array of bipolar op-amps acting as low power drivers for 10 high-power, extremely low loss (Rds-On value) N-Channel MOSFETS acting as high-side drivers. Each MOSFET is capable of supplying greater than 20 DC amps/node with a dissipation factor significantly less than 1 watt/MOSFET. The driver circuits are inherently frequency limited to eliminate the possibility of high-frequency oscillations. The MOSFETS are inherently capable of billions of cycles of use with no inherent failure mechanism, such as would be exhibited in any electromechanical system.

The architecture used in the application of the MOSFETS allows a single 5 kW TVS diode to protect all 10 output MOSFETS from environmental electrical anomalies such as load-dump.

Environmental Monitoring

The integrated analog to digital converter is referenced against a precision voltage source, and is used to monitor three critical parameters associated with the longevity of the MOSFET output stages. Those monitored environmental factors are:

NOTE: all environmental set points are configurable to meet application need.

1—Primary system voltage is measured to be sure that loads are not applied to a battery that is functionally dead, and that the primary voltage is high enough to allow the voltage doubling charge-pump circuits to provide adequate drive voltage to prevent catastrophic failure of the MOSFET devices.

2—Charge pump voltage is monitored to be sure that the voltage levels presented to the MOSFET gate drivers is adequate so as to prevent under-drive biasing the MOSFET into the linear region as driven into a low resistance load causing catastrophic failure of the MOSFET.

3—Localized temperature is monitored to prevent damage to integrated circuits in the event of severely elevated temperatures potentially caused by an event such a vehicle fire. The cutoff temperature is also set to prevent system runaway in a situation of elevated temperatures.

Primary Power Supplies

The primary power for the power cell is provided by the primary DC source in the application, which is also used to power the loads. In one embodiment, the regulated, linear, 12 Volt and 5 Volt power supplies are protected by a primary 5 Kw TVS diode. The system will continue to function to a primary input voltage of 5.2 volt for the logic elements and approximately 11.5 volts for the charge pump circuits. The power paths are multi-redundant and are supplied, preferably, through (4), (14) gauge TXL wire.

Electrical and Environmental Characterization

The power cell exhibits an extraordinary watt density/cubic inch of space capacity due to the extremely low channel resistance of the application MOSFETS. In one preferred embodiment, each power cell node is rated to deliver approximately 23 amps of continuous DC power and brief (500 ms or less) periods of up to 100 amps of DC current. In this case, the total capacity of any individual power cell is 100 DC amps continuous over the temperature range of −85 to +125 Degrees Centigrade. Some power de-rating is necessary near the limits of the integrated circuits operating temperatures as specified by the manufacturer of the integrated circuits.

In other cases, where devices of interest exist to satisfy, for example, a military temperature range; those devices are use in the Power Cell circuitry.

Each MOSFET node, in addition to the intelligent factors management of those nodes, can also be protected by an ATC style replaceable "Mini-Fuse".

Load Fault Indication

A unique feature is that each MOSFET node is designed to diagnose the locally attached electrical load and state of the "Mini Fuse," and indicate the state of the circuit load and fuse condition. This indication is presented, for example, to the user with 3 discrete states of a discrete LED/node indicator. Those states are:

1—LED is OFF: this active state indicates that the electrical load attached to the MOSFET node is capable of completing the circuit when the power is applied and that the ATC "Mini Fuse" is intact and operational.

2—LED at 25% brightness: this active state indicates that the electrical load is not capable of supporting current flow, or that the fuse protecting the circuit has open circuited.

3—LED 100% brightness: this active state indicates that the MOSFET is conducting electrical current and delivering the current to the protecting "Mini Fuse" and associated electrical load.

4—Additionally, the LED is positioned in such a way as to illuminate the body of the "Mini Fuse" to aid in its location and replacement under minimum lighting conditions.

Intelligent Logic Power Supply Management

The power supply operates the microcontroller and logic circuits, and is intelligently managed by the microcontroller and independent microcontroller watch-dog chip. In the event of an internal software error, or an SCR condition on the substrate of the microcontroller, the power supply will shut itself off within 200 ms and then restart, clearing the condition on the microcontroller substrate or software induced error. This feature protects the system, for example, even in 6-sigma events.

CAN Connectivity

The power cell carries a receptacle and plug connection for the uncommitted end of the CAN bus architecture and electrical interface. This opposing end of the CAN bus is terminated through connectors (for example, DB-9) on the "last" power cell in the system. The CAN physical interface takes place, for example, through standard DB-9 connectors and utilizes redundant pairs of wires to mitigate failure do to the loss of a single wire connection. The CAN bus, in a preferred embodiment, is protected on each cell with a special TVS diode array to mitigate bus failure caused by electrical transients.

Failure "Proof" Interface

The power cell has an interface that allows direct control over the MOSFET outputs in the event of a failure of the intelligent elements in the system. This allows for circumvention of failure that would otherwise render the system as useless. Two mechanical and electrical headers are provided on the power cell PCB to allow for attachment of simple external switches to manually operate the nodes. When operated in this state there is no personality features, in place managing the node. The node becomes a simple ON-OFF device which is the most basic, and therefore reliable, control state possible.

Cell—Node Addressing and Redundancy

A TRUE BCD mechanical switch provides address selection for the power cell to allow for its existence one of many power cells in the system. Two power cells can exist at the same system address and provide any level of redundancy that is required in the system. Two (or more) power cells can also be set to supply power to any electrical load as an on-line, real-time backup.

Power Cell Software

The Processing Engine—FIG. 11 shows an exemplary flow of the processing engine for managing the power cell in connection with the present disclosure. In the software of the system, each of the cell, power and master, is designed as processing engines without a fixed personality. Each of these software engines has, at its disposal, resources (properties, methods and events) that it can allocate, in any combination, dynamically, to perform a specific type of task in a specific way. For example, a system delivered with the software engines in-place and functional will not perform until the desired functions are determined and assigned as personality profiles to operate the MOSFET nodes on the power cell. These dynamically assembled personalities can be assigned to any of numerous MOSFET nodes on the power cell.

In an exemplary application using the system, a node can be running the headlights in a Fire Truck and in the next moment be operating a PWM controlled hydraulic motor without physical changes to the system. Operation of the system in this embodiment is as follows. Internal to the software structure on the Power Cell are the following arrays that provide the utility to create and dynamically allocate the (properties, methods and events) to give the MOSFET output nodes their ad-hoc configurability:

- NOTE: Any array element listed is dynamically configurable to meet user/customer need.
- CUSTOMER PATTERN ARRAY (preferably EEPROM based)—This array manages resources associated with customer based custom pattern generation for the MOSFET outputs. Any pattern can be created to satisfy any need. For example, an "SOS" pattern may be coded into the an array in the evaluation power cell.
- NODE—CUSTOMER PATTERN ARRAY (preferably RAM based)—Used to manage the application of customer supplied custom patterns.
- COM FAILURE STATE ARRAY (preferably EEPROM based)—This array holds that default states that should be adopted by each MOSFET output node in the event of a communications failure. There are 3 default states that can be chosen by the customer.
- PACKET BUFFER ARRAY (preferably RAM Based)—This array manages all communications inbound or outbound from the cell.
- NODE—SOFT START TIMER ARRAY (preferably RAM based)—Used to manage assignment of the soft-start method as it applies to usage on a specific node.
- NODE—TIMED PROPERTIES ARRAY (preferably RAM based)—Used to manage the application of timing elements associated with node management.
- NODE—SOFT START TOGGLE STATE ARRAY (preferably RAM based)—Used to manage the application of customer application of soft-start as applies to the toggle method.
- NODE—PROPERTIES ARRAY (preferably RAM based)—(4) dimensions, (10) elements is the primary array where the personality features for each cell are assembled, coordinated, managed and executed. It should be noted that the number of dimensions and elements can be changed.
- ARRAY LOCATION—The array structures are field programmable, and stored in memory, preferably EEPROM. The array structures are therefore protected from any loss of system power, and would include the details of features like Communications Failure Management and Customer Pattern generation. Other elements of the control arrays are preferably held in RAM as to be configured ad-hoc during execution of the application.
- TERMINATION OF FUNCTION—When a switch is turned on/off the master controller, that is affecting a specific node on a specific power cell, that node on that cell is returned to a neutral (no personality attribute) state. This mitigates the risk of an aberrant node enforcing an unexpected state on the output MOSFET nodes on a given power cell. A fresh copy of the node attributes is installed in the control arrays each time a node is instructed to turn on, by the master controller.

In the array dimensions construct are coded classes of functions that act as primary directives when evaluated by the target power cell. The message classes allow layered processing so that messages can be evaluated and processed in the least number of CPU cycles, improving system performance.

The actions taken on the packet construct is the opposite of what takes place on the master cell. In the power cell the packet is de-constructed, analyzed for correctness and used to dynamically allocate the properties, methods and events to successfully manage the nodes personality profile, in application.

The simplified form of the details below is as follows:

1) Dimension-0 this is the CELL that the switch function is assigned to:
   Any switch can be assigned to any cell, there is no fixed relationship between any switch and the job that it will do or where that job will be performed.
2) Dimension-1 this is the NODE that the switch function is assigned to:
   Any switch can be assigned to any node on any cell.
3) Dimension-2 this is the PERSONALITY-TYPE of the node:
   Any node can assume the functional personality that is appropriate to the task and the man/machine interface, there is no fixed functionality.
4) Dimension-3 this is a TIME or FREQUENCY function/action amendment:
   These elements act to amend the basic functionality as defined in Dimension 2.
5) Dimension-4 this is a TIME, FREQUENCY or DIRECTION function/action amendment:
   These elements act to further amend the traits assigned in Dimension 2.

These directives include the fundamental class of a transmitted packet:

MESSAGE CLASSES:

Message Class is a Configuration Command to define the personality of a Cell-Node Message Class is a Request for Information or Status Message Class is a Response to Request for Information or Status Message Class is a System Wide Broadcast How the message is to be routed:

ROUTING:

Target Cell ID

Amenders determine target Cell Class (Master—Power)

Target Node ID

How the output node is to be configured initially:

NODE CONFIGURATION

Target Node State when directive is enforced

The personality traits the node should exhibit:

1) MESSAGE CLASSIFICATION AMENDERS (personality)
   a) TRACK (default state): the output node tracks the state of the input switch as sent from the master.
   b) TRACK-SOFT-START: the node produces a 50% PWM output for 500 ms then the output node tracks the state of the input switch as sent from the master.
   c) MOMENTARY: the node is a timed output measured in a time base of milliseconds as the smallest unit.
   d) MOMENTARY-SOFT-START: the node produces a 50% PWM output for 500 ms then produces a timed output measured in a time base of milliseconds as the smallest unit.
   e) TOGGLE: the output toggles ON/OFF with alternate states of a switch.
   f) TOGGLE-SOFT-START: the node produces a 50% PWM output for 500 ms then a steady state that toggles ON/OFF with alternate states of the input switch.
   g) TIMED: the node produces a 50% PWM output for 500 ms then the output node will remain on for a predetermined number of seconds using a time base of 1 second as the smallest unit.
   h) TIMED-SOFT-START: the node produces a 50% PWM output for 500 ms then the output node will remain on for a predetermined number of seconds using a time base of 1 second as the smallest unit.
   i) TURN ALL OUTPUTS OFF: Turn all the output nodes on this cell OFF, basically an EMERGENCY Shutdown command.
   j) TURN All OUTPUTS ON: Simple system checkout based on a stored pattern or steady state output.
   k) PATTERN SELECTION (any custom pattern is possible): Tells the power cell that a selection is to be made for a given output NODE to produce a specific repeating pattern of ON/OFF states typically used on emergency vehicles. This can also be use to do signaling such as on a boat or ship for SOS transmission.

Functions that require additional discussion to determine application. Some of these will require alternative output types on the power cells and/or monitoring of some analog device on the master cell for control or feedback purposes.

2) Functions include:
   a) STEPPER UNI-POLAR: A set of (4) outputs produce step patterns.
   b) STEPPER BIPOLAR: A set of (4) outputs produce step patterns.
   c) SERVO: A set of outputs produces output and feedback patterns.
   d) PWM: A set of outputs produces PWM rates or patterns.

These are the "settings" associated with the personality of the node like time or PWM frequency.

MESSAGE PARAMETERS

USAGE (Depends Messaging and Node Configuration)
Condition 1—BYTE 1 defines a Timed action
Condition 2—BYTE 1 defines a Momentary action
Condition 3—BYTE 1 defines a Stepper Motor Action
Condition 4—BYTE 1 defines a PWM Action
Condition 5—BYTE 1 defines a SERVO Motor Action
Condition 5—BYTE 1 defines the selection of a Power Cell STORED PATTERN These have the ability to further amend the basic parameters or add additional features MESSAGE PARAMETER AMENDERS
Condition 1—BYTE 1 defines a Timed action
Condition 2—BYTE 1 defines a Momentary action
Condition 3—BYTE 1 defines a Stepper Motor Direction
Condition 4—BYTE 1 defines a PWM Duty Cycle
Condition 5—BYTE 1 defines a SERVO Motor Action
Error check is by necessity last.
ERROR CHECK BYTE: The mathematical form of all the above information is used by the target cell to check the integrity of the data transmission and validate it's contents.

RF Transmitter—Receiver Sub-System—Hardware

The sub-system provides, for example, a RF (preferably 900 Mhz) management of up to 15 overall nodes distributed across any number of power cells. There is no restriction as to how the 15 control points are distributed or how many nodes can be assigned to any Cell. The functions of the transmitter and receiver pair are a functional analog to those functions included within the master cell. The single point of difference is that the switch closures that instruct the power cells to do their jobs are issued over a radio link. Both the transmitter and receiver are configured to carry "activity" indicators that provide visual feedback to the operator or user of the system that all functions are taking place as "expected". Additionally, provisions may be made for the receiver to be "pluggable" into a specially configured socket on the master cell PCB. The master cell can automatically recognize the presence of the RF sub-system and create a communications link between the two elements.

RF Receiver Sub-System—Software

The features of the receiver are nearly identical to the master controller. The identical control arrays exist and construct data packets in the same format as the master controller. The difference is that the software in the receiver constructs finished packets, and then passes them to the master cell for subsequent transmission. The transmitter software encodes a unique MAC address that is included within each of the radio modules and uses that address as a preamble to every transmission. On initial use, the transmitter is "taught" to the receiver. This process registers the unique MAC address in the EEPROM memory of the receiver to allow unique "pairing" relationships to exist between a transmitter and receiver combination. A receiver sub-system can "learn" several transmitters, which give the ability to control up to numerous independent nodes using an RF interface. All of the dynamic allocation and re-assignment that are features of the master cell are also present in the RF Receiver sub-system.

RF Transmitter Sub-System—Hardware

The features of the transmitter are an analog to the switch inputs provided for on the master cell. The difference is that switch closures (keyboard on remote) are relayed to the RF Receiver sub-system for subsequent processing by the receiver. The keyboard is scanned in a unique manner that allows any of the switch closures to be detected with the execution of only 2 instruction of the processor, in a preferred embodiment.

RF Transmitter Sub-System—Software

The transmitter software encodes a unique MAC address that is included within each of the radio modules, and uses that address as a preamble to each transmission. On initial use, the transmitter is "taught" to the receiver. This process registers the unique MAC address in the EEPROM memory of the receiver to allow a unique "pairing" relationship to exist between a transmitter and receiver combination. A receiver sub-system can "learn" up several transmitters, which give the ability to control numerous independent nodes using an RF interface.

LCD Maintenance Sub-System

This sub-system provides utility to the operator(s) of the system in allowing information requests to be forwarded to the any power cell in the system, and to display the responses to those requests on an LCD display. The responses characterize environmental and node-state information to the operator. Software that manages the LCD display is preferably included in the master cell, but may be stored in other areas.

It should be understood that various changes and modifications to the presently preferred embodiments described herein will be apparent to those skilled in the art. Such changes and modifications can be made without departing from the spirit and scope of the present subject matter and without diminishing its intended advantages.

The invention is claimed as follows:

1. A system, comprising:
a master cell;
a delegate cell;
an input device inputting to the master cell;
the master cell configured and arranged to buffer a state of the input device and output an encoded message to the delegate cell;
a processor of the master cell that evaluates the state of the input device, and compares a current state of the input device to a previous state of the input device to validate a state change, the input device state stored in an a processor array; and wherein
the input device state stored in the processor array is used via the encoded message to the delegate cell by a delegate processor of the delegate cell to decode and associate the validated state change with at least one predefined function.

2. The system of claim 1, the processor programmed to perform the comparison on a bit by bit bases basis.

3. The system of claim 1, wherein the input device is a radio frequency input device or an input circuit.

4. The system of claim 1, wherein the decoding and associating includes:
selecting at least one element from an array pool; and
assembling the at least one selected element as a data packet.

5. The system of claim 4, further comprising
a communication data bus that receives the data packet, and wherein the delegate processor:
decodes a cell address in the data packet to determine if the cell address matches a destination cell address of the delegate cell, and
if the cell address in the data packet matches the delegate cell address, disassembles and decodes the data packet, and
temporarily stores the decoded packet.

6. The system of claim 1, wherein the buffering is performed via a packet buffer array used by the delegate processor to manage the output from the master cell to the delegate cell.

7. The system of claim 1, wherein the at least one predefined function is stored by the delegate cell.

8. The system of claim 1, wherein the decoding and associating is performed from one of: a single input to multiple functions, multiple inputs to a single function, a single input to a single function and multiple inputs to multiple functions.

9. A method for interfacing devices comprising:
providing a master cell including a master cell processor and a delegate cell including a separate, delegate cell processor;
producing an output from the master cell to the delegate cell;
buffering at the delegate cell a state of an input to the master cell derived from the output;
enabling a decoder based on the state of the input device;
comparing a current state of the input device to a previous state of the input device to validate a state change using the master cell processor; and
decoding and associating the validated state change using the delegate cell processor.

10. The method of claim 9, which includes performing the comparison on a bit by bit basis.

11. The method of claim 9, wherein enabling the decoder, the comparing and the decoding occur at the delegate cell.

12. The method of claim 9, wherein decoding and associating the validated state change includes using at least one predefined function.

13. The method of claim 9, which includes decoding and associating from one of a single input to multiple functions, multiple inputs to a single function, a single input to a single function and multiple inputs to multiple functions.

14. The method of claim 9, wherein the decoding and associating includes: selecting at least one element from an array pool; and assembling the at least one selected element as a data packet.

15. The method of claim 14, further comprising a communication data bus that receives the data packet, and which further includes:
decoding a cell address in the data packet to determine if the cell address matches a destination cell address, and
if the cell address in the data packet matches the destination cell address, disassembling and decoding the data packet, and
temporarily storing the decoded packet.

16. The method of claim 9, which includes programming the master cell remotely.

17. The method of claim 9, which includes outputting from the master cell to a second delegate cell and enabling, comparing and decoding at the second delegate cell for a second input to the master cell.

18. The method of claim 9, which includes producing the output upon activation of the input device.

19. The method of claim 18, which includes storing the input device state as part of an array.

* * * * *